J. H. DOOLEY.
SPEED REGULATOR CALIBRATION MEANS FOR PHONOGRAPHS.
APPLICATION FILED AUG. 25, 1917.
1,283,696.
Patented Nov. 5, 1918.
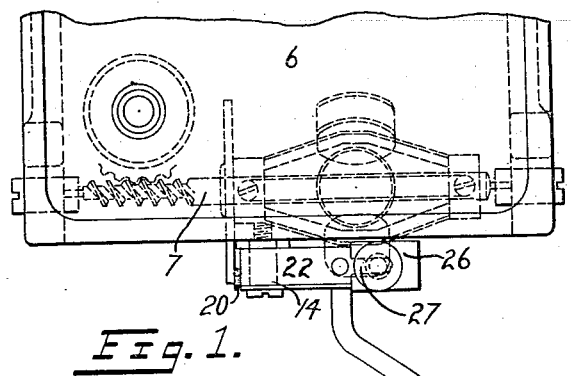
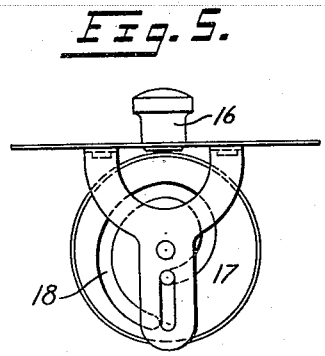
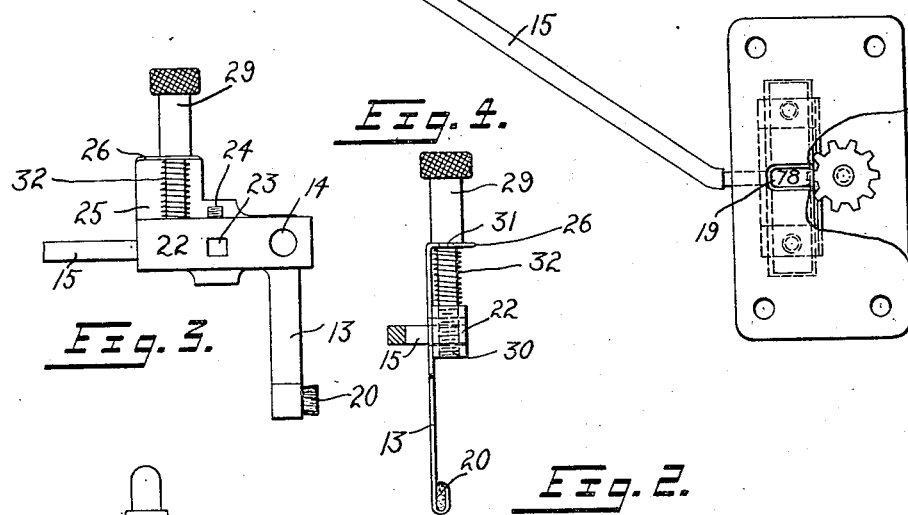
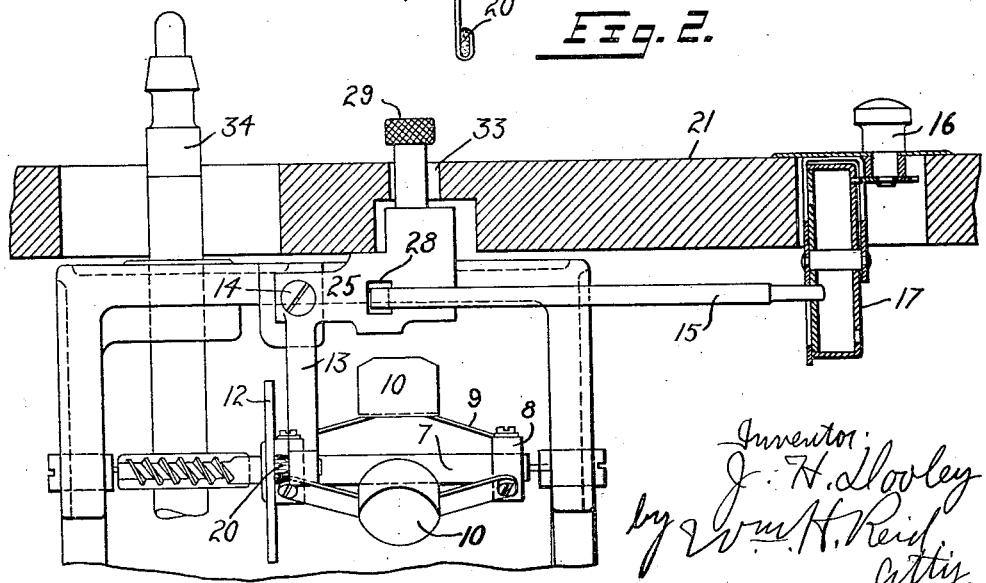

UNITED STATES PATENT OFFICE.

JAMES H. DOOLEY, OF EAST ORANGE, NEW JERSEY, ASSIGNOR TO DE CAMP AND SLOAN, INC., OF NEWARK, NEW JERSEY, A CORPORATION OF NEW JERSEY.

SPEED-REGULATOR CALIBRATION MEANS FOR PHONOGRAPHS.

1,283,696.     Specification of Letters Patent.     Patented Nov. 5, 1918.

Application filed August 25, 1917. Serial No. 188,095.

*To all whom it may concern:*

Be it known that I, JAMES H. DOOLEY, a citizen of the United States, and resident of East Orange, in the county of Essex and State of New Jersey, have invented certain new and useful Improvements in Speed-Regulator Calibration Means for Phonographs, of which the following is a specification.

This invention relates to the speed control of phonograph motors, that are adjustable on the base board by shifting a speed indicator operating means; and the invention has for its object to provide a special adjusting member for such control, that projects up through the base to permit calibration of the speed device at any time during the operation of the instrument.

In the accompanying drawing showing one embodiment of my invention, Figure 1 is a plan view of a portion of a phonograph motor and the speed control with my invention applied. Fig. 2 is a side elevation. Fig. 3 is a partial elevation of the adjusting parts. Fig. 4 is a side view of the parts shown in Fig. 3; and Fig. 5 shows the speed regulating adjustment.

As shown in the drawing the motor of the phonograph or other instrument is represented by 6, the principal parts shown being the governor shaft 7 that carries a collar 8 to which the three springs 9 are secured. These springs carry the weights 10 and their other ends are connected to the disk 12 that slides free on the shaft 7. This is the usual mechanism for speed regulation, and the disk 12 engages a brake arm 13 when the speed exceeds a predetermined limit, whereby the friction of the disk on the arm will prevent further increase in the speed. To regulate the speed of the motor by the operator it is customary to provide means operable from the outside of the instrument whereby this brake arm can be shifted or adjusted. In the present construction the brake arm 13 is pivoted at 14, suitably connected with a bar 15. The latter extends beyond the motor and is controlled by a head 16, through suitable mechanism forming no part of the present invention. As shown the head 16 serves to turn a drum 17, provided in one face with an evolute slot 18 into which the extremity of the bar 15 projects. By this means turning of the head will swing the brake arm 13 to and from the disk 12, and hence adjust the maximum speed of the instrument as controlled by the governor.

When the instrument is first assembled it is necessary to bring the indication on the drum 17 to register with the opening 19 in the regulation device. Also, from time to time several parts may change their relative position, and the contact piece 20 on the brake arm, usually felt, becomes worn or compact whereby the speed will not correspond with the indication. This invention provides means for making the proper calibration for the speed indicator, and which is operable during the operation of the instrument, and from the top of the base board 21 of the phonograph. As shown I provide a block 22, to which the bar 15 is secured, shown as projecting into an opening 23 in the block and fastened therein by a screw 24. The brake arm 13 is in the form of a plate of sheet metal, having an extension 25 beyond the pivot 14, at one edge of which is a flange 26 containing a slot. This plate swings on the pivot 14 independent of the swing of the block 22 thereon, and a slot 28 in the plate is provided to admit the bar 15, that serves to limit the swing of the plate 25 relative to the block. An adjusting screw 29 passes through the slotted flange 26 and turns in a threaded bore in the block, the screw being provided with an angular groove 31 adjacent the head, at which portion it engages the slotted flange, thereby causing the flange and plate to turn on the pivot 14 relative to the block 22 on turning the screw. A coil spring 32 is shown to provide friction on the screw and take up lost motion, but is not essential.

It will be observed from Fig. 2 that the screw is vertical and projects through an opening 33 in the base board 21. The opening is sufficiently large to permit of the swinging of the brake arm and connected bar 15 on the pivot 14. The screw 29 is readily accessible and can be turned during the rotation of the instrument. The shaft 34 for the turntable can be timed by suitable means. and if the indication in the regulator is not the correct one the screw 29 is turned until the calibration is the one indicated.

The form of speed regulator and indicator shown herein forms no part of the present invention, but forms subject matter of U. S. Patent No. 1,265,757.

Having thus described my invention, what I claim is:—

1. In a phonograph motor, the combination of a speed governor including a stop member shiftable back and forth according to the speed, a brake arm movable to engage said stop at different positions thereof to control the speed of the motor, an adjustable indicating device connected with said arm for controlling the brake arm from the top of the base board, and an adjustable member on the brake arm remote from said indicating device having an operating portion extended to project up through the base board to permit calibration of the speed during operation of the instrument.

2. The combination in a phonograph motor, of a speed governor including a stop member shifted back and forth according to the speed, a brake arm movable to engage said stop at different positions thereof to control the speed of the motor, a bar connected with said brake arm, an adjustable indicating device connected with said bar for controlling the brake arm, and a member adjustably connecting the brake arm and bar and having an operating portion extended to project up through the base board to permit calibration of the speed during operation of the instrument.

3. The combination in a phonograph motor, of a speed member including a stop member shifted back and forth according to the speed, a brake arm pivoted to swing to engage said stop at different positions thereof to control the speed of the motor, a block arranged to swing on the pivot of the brake arm, a bar fast to the said block, an adjustable indicating device connected with said bar for controlling the brake arm, and an adjusting screw connected with the block and arm to swing the block relative to the arm and lock these members in calibrated positions.

4. The combination in a phonograph motor, of a speed member including a stop member shifted back and forth according to the speed, a brake arm pivoted to swing to engage said stop at different positions thereof to control the speed of the motor, a block arranged to swing on the pivot of the brake arm, a bar fast to the said block, an adjustable indicating device connected with said bar for controlling the brake arm, and a vertical adjusting screw connected with the block and arm to swing the block relative to the arm and lock these members in calibrated positions, and arranged to project up through the base board for calibration during operation of the instrument.

5. The combination in a phonograph motor, of a speed member including a stop member shifted back and forth according to speed, a brake arm pivoted to swing to engage said stop at different positions thereof to control the speed of the motor, a block arranged to swing on the same pivot of the brake arm, a bar fast on the said block, an adjustable indicating device connected with said bar for controlling the brake arm, an adjusting screw connected with the block and arm to swing the block relative to the arm and lock these members in calibrated positions, and means for limiting the swing of the block relative to the arm.

6. The combination in a phonograph motor, of a speed member including a stop member shifted back and forth according to the speed, a sheet metal brake arm pivoted to swing to engage said stop at different positions thereof to control the speed of the motor, a block arranged to swing on the pivot of the brake arm adjacent the arm and having a threaded bore, a bar fast to the said block, an adjustable indicating device connected with a bar for controlling the brake arm, an extension on the brake arm having a slotted flange, and an adjusting screw in the bore of the block, and turning in the flange slot to swing the block relative to the arm and lock these members in calibrated positions.

7. The combination in a phonograph motor, of a speed member including a stop member shifted back and forth according to the speed, a sheet metal brake arm pivoted to swing to engage said stop at different positions thereof to control the speed of the motor, a block arranged to swing on the pivot of the brake arm adjacent the arm and having a threaded bore, a bar fast to the said block, an adjustable indicating device connected with a bar for controlling the brake arm, an extension on the brake arm having a slotted flange and an adjusting screw in the bore of the block, and turning in the flange slot to swing the block relative to the arm and lock these members in calibrated positions, the said arm extension having a slotted portion through which said bar passes to limit the swing of the arm by the screw.

JAMES H. DOOLEY.

Witness:
EDWARD L. DUNCAN.

Copies of this patent may be obtained for five cents each, by addressing the "Commissioner of Patents, Washington, D. C."